MOORE & PARROTT.
Locomotive.
No. 8,561.    Patented Dec. 2, 1851.
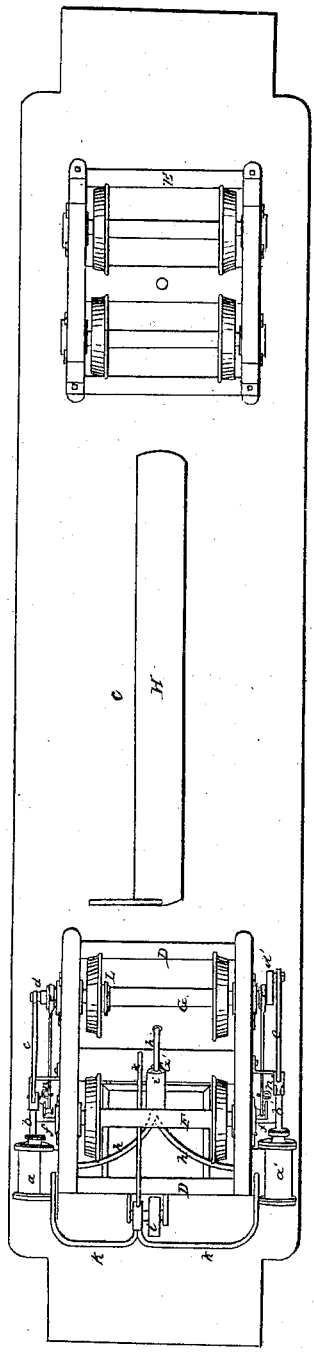
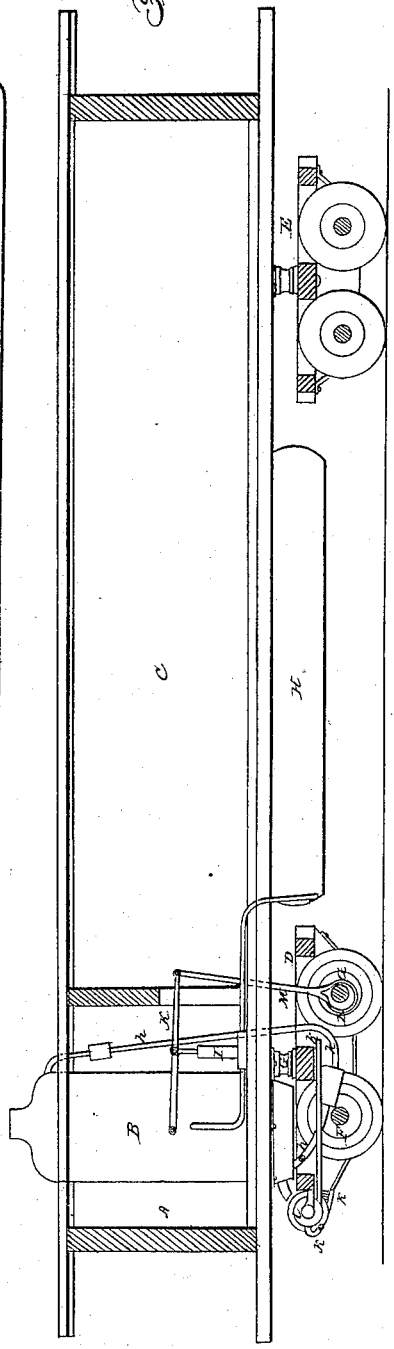
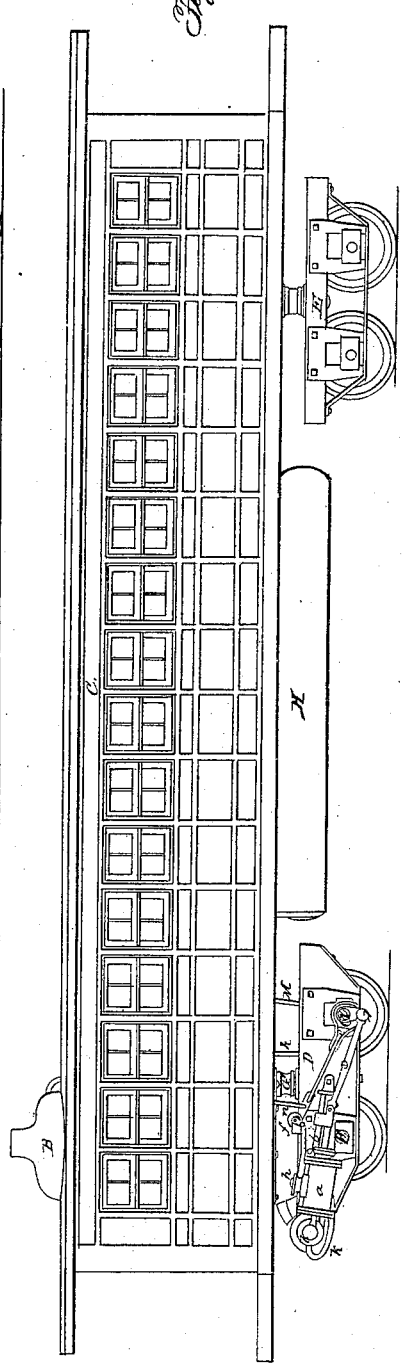

UNITED STATES PATENT OFFICE.

JOSEPH H. MOORE AND WM. P. PARROTT, OF BOSTON, MASSACHUSETTS.

STEAM-CARRIAGE FOR RAILWAYS.

Specification of Letters Patent No. 8,561, dated December 2, 1851.

*To all whom it may concern:*

Be it known that we, JOSEPH H. MOORE and WILLIAM P. PARROTT, of Boston, in the county of Suffolk and State of Massachusetts, have invented a new and useful Improvement in Steam-Carriages for Railways; and we do hereby declare that the same is fully described and represented in the following specification and accompanying drawings, letters, figures, and references thereof.

Before proceeding to an illustration and explanation of our invention or improvement, it may be well for us to state what has led us to the production of it.

It is well known that the transportation of passengers or freight on railways by means of steam locomotion is mostly or generally effected by a steam motor (termed a "locomotive engine") and one or more passenger or freight cars, the whole constituting a "train" of cars. It is also well known that there is exclusively in use in this country where it had its origin a peculiar kind of freight or passenger carriage, which by common usage and in order to distinguish it from other cars has been called and is generally known by the name of the long car. It consists of a long carriage body mounted on two or more rotating, movable truck frames, each of which truck frames is supported by or on four wheels. It is to such a carriage that our improvement or invention more particularly appertains. We have converted such a carriage into a steam carriage possessing not only the power of impelling itself and its freight or passengers, but of drawing one or more freight or passenger cars attached to it.

According to the common mode of effecting the transportation of freight or passengers and particularly the latter on railways, a locomotive engine separate from the freight or passenger car or cars is used, and whether the number of passengers or the quantity of freight be large or small such an engine must be employed. It often costs for tractive power very much more to move such engine and cars over a railway than is derived from tolls on the passengers or freight carried by the same. Besides this the wear and tear of the road and machinery are other items of expense. If we can reduce the weight of carriage moved and the number of wheels in operation, we effect a consequent reduction of cost of carriage of the weight transported.

On almost every railway it is often desirable to run what are termed light trains and particularly if it has branch roads leading from it. The cost of running such a train (which under the present or past system of working it would consist of a locomotive steam engine and at least one freight or passenger car) is so great as to prevent its employment in many instances where it would be desirable to run it. Thus many persons on or near the line of a railroad are necessarily deprived of facilities of steam transportation which by means of our improvement can be extended to them, for by it we are able by a small addition of weight to the long car to entirely dispense with the wheel locomotive engine and its tender, thus saving much of the cost of moving them and that of the wear and tear of the machinery and the roadway.

Our invention to a certain extent if not entirely consists in combining with one of the movable truck frames of a long car and one or more of the axles of its wheels one or more steam engines, (such combination being in such manner as to enable such engine or engines to operate or turn or cause such axle or axles to rotate), in connection with arranging the boiler or steam generator and its furnace on the carriage body or frame and connecting the steam engine or engines and the boiler or steam generator by a flexible pipe or its mechanical equivalent such as will allow of all the necessary rotary, rocking or other movement of the truck frame.

We are aware that a steam engine has been directly connected with a fixed driving axle, as such is done in the present locomotive as well as in steam carriages for common roads. By the term "fixed axle" we mean one which is so applied to the carriage as to be capable of a rotary motion only, it not being capable of a horizontal vibratory movement as is the case with the forward axle of the "long car" above mentioned. We are not aware that an axle of the truck frame of the long car has ever had a steam engine applied directly to it or to a crank on it to put it in rotation.

Of the drawings above mentioned Figure 1 represents a side elevation of a "long car" having our improvement applied to it. Fig.

2 is an underside or bottom view of it. Fig. 3 is a vertical and longitudinal section of it.

At or near one end or in any other proper part of the body of the carriage, we make an apartment A (see Fig. 3) for the reception of the steam generator B, and such fuel or other matter as may be necessary thereto. The remainder or part C of the carriage body or frame is to be devoted or fitted up in the usual manner for the reception of freight or passengers.

The truck frames of the car are seen at D, and E in the drawings, they being applied to the body of the car in the usual or any proper way, so as not only to have a horizontal rotary motion such as will enable them to accommodate themselves to the curves of the railway track, but so as also to enable them to rock both transversely and longitudinally as in accordance with the undulations thereof.

Directly or on the truck frame of the cars we affix or arrange one or two steam cylinders or engines with the necessary appendages, connecting such with one or both the shafts or axles F or G, of such truck frame in such manner as to enable such engines when supplied with steam to put such axle or axles in rotation.

In the drawings the steam cylinder of each engine is seen at $a$, or $a'$; its piston rod and slide at $b$, or $b'$; its connecting rod at $c$, or $c'$; its crank at $d$, or $d'$; its valve eccentric at $e$, or $e'$, and its valve gear or operation apparatus at $f$ or $f'$. The pin or bolt on which the truck frame rotates horizontally is seen at G. The pipe by which steam is conveyed from the boiler to the steam chest of one or both the engines is shown at $h$. It is made flexible or with a steam tight ball and socket joint in it, such as will allow of all the necessary movement of the truck frame or carriage body thereon. The ball and socket joint is seen at $i$. The pipe for the escape of waste steam from such engine will be found represented at $k$. It may be introduced into and made to pass through a steam chest and put in operation a wheel of buckets or fans arranged within such chest and so as to put in rotation a fan blower or blast apparatus so as to throw air into the furnace of the boiler or steam generator. The situation of such blast apparatus we have shown at $l$.

The tank for the supply of water to the boiler may be arranged under the bottom of the carriage body as seen at H. A pipe may lead from it to a force pump I, which pump may be worked by a lever K, raised and depressed by an eccentric L, and connecting rod M, the said eccentric being applied to the axle driven by the engine.

The connecting rod of the valve apparatus may be raised or lowered by means of a rod $n$, jointed to it and extended up into the engine boiler room and within reach of the engineer.

We have constructed on our improved plan and put in operation a steam passenger carriage or long car. Our experiments therewith have been productive of the most satisfactory results. The common long car as now built carries about seventy passengers. Such a car with a locomotive engine and tender may be set down to weigh exclusive of its passengers, say twenty four tons; the car weighing eight, the engine twelve, and the tender four tons. A carriage on our improved plan to transport the same number of passengers, viz, seventy, would weigh twelve tons. The weight of carriage to be moved is thus reduced one half. The cost of such an engine and its tender would not at the present prices vary far from about six thousand dollars. The cost of a long car is about two thousand dollars. Thus we see that the first cost of a train of such a description to be capable of transporting seventy passengers would be not far from, if not to exceed eight thousand dollars. One of our improved steam carriages capable of carrying a like number of passengers would cost about, or not in all probability exceed the sum of four thousand dollars; that is, two thousand for the engine and boiler, and two thousand for the car. Here then is a saving of fifty per cent. on the first cost. The saving on each of the items of interest, cost of working, wear and tear of the road and machinery, would in all probability be fifty per cent. or more.

The steam carriage we have constructed, although as yet imperfect in many of its details, we have been able to run and have run at a rate of forty miles per hour. Its advantages over the old mechanism of locomotive engine, tender and car, may therefore be set down as, in a saving of dead weight and consequently of wear of track and machinery; a saving in consumption of fuel and wages of men, as two men on it can manage it and attend to the passengers, whereas four men are requisite on the "train" plan. It renders a railway company able to run oftener and thus better accommodate the public; to build and work branch roads which the cost of working by the present or old system of working by steam power could not be built and operated so as to be profitable.

A long car steam carriage is very much more manageable, and can be stopped and started very much easier than a locomotive train. Besides the above there are many other advantages that it may be said to possess, and which actual experience would warrant us in asserting.

Now we wish it distinctly understood that we do not claim the combination of a steam engine with the axles or body of a carriage; nor do we claim any arrangement of it by which it is directly applied to a "fixed" axle or one so connected directly with the carriage body that, other than a rotary motion, it can have no horizontal and rocking movements independently of the same; but, What we do claim as our invention or improvement is—

The arrangement or arranging the steam engine directly on a movable truck frame of a "long car" or carriage in combination with arranging the boiler or steam generator on or in the carriage body or frame, and connecting the engine and steam generator by a flexible pipe, or pipe having a ball and socket or other equivalent connection or joint, such as will allow of all the necessary rotary and rocking movements of the truck frame and carriage body; the whole being substantially as hereinbefore described.

In testimony whereof we have hereto set our signatures, this twenty-third day of October A. D. 1851.

JOS. H. MOORE.
WM. P. PARROTT.

Witnesses:
R. H. EDDY,
DANIEL GOWING.